…

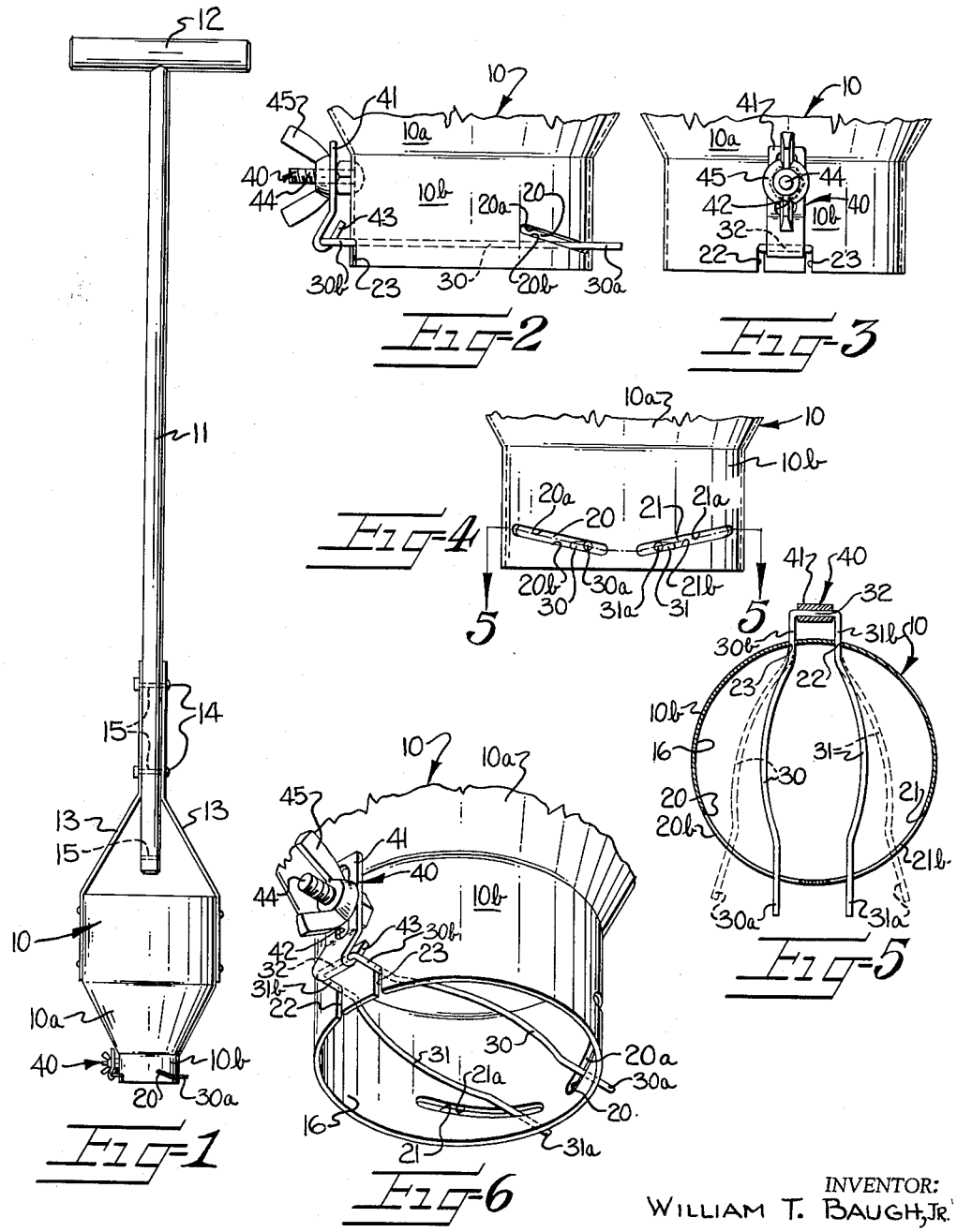

United States Patent Office 3,026,666
Patented Mar. 27, 1962

3,026,666
NUT PICKER
William T. Baugh, Jr., 833 Linda Lane, Charlotte, N.C.
Filed Jan. 5, 1960, Ser. No. 556
6 Claims. (Cl. 56—328)

This invention relates to a device for gathering nuts and the like from the ground.

More specifically, this invention is directed to a device for gathering nuts and the like from the ground wherein a container is provided for receiving the nuts through an open bottom therein and wherein means are provided in the opening in the bottom of the container for gathering and retaining the nuts passing therethrough. Many devices of this broad description are shown in the prior art but the instant invention is directed to improvements thereover.

The primary object of this invention is to provide improved means cooperating with the open bottom of a container for gathering and retaining the nuts and the like passing therethrough.

More specifically, the improved means cooperating with the open bottom of the container for gathering and retaining nuts and the like passing therethrough takes the form of a pair of resilient arms positioned in the opening of the container in such manner that each of the arms may readily move apart at corresponding ends thereof during the movement of a nut or the like between the arms. The other corresponding ends of the arms are preferably connected together and adjustably secured to the container to permit the ready replacement of the resilient arms in the event of their being worn or broken or in the event that it is desirable to replace the arms with different shapes or sizes of arms in accordance with extreme sizes of nuts or other objects to be gathered.

A further feature of the invention is the provision of guiding surfaces for the end portions of the resilient arms which move apart from each other, with the guiding surfaces preferably being arranged so as to direct the resilient arms in an upwardly inclined or diverging path of travel during the passage of a nut between the arms to thus aid in prolonging the life of the resilient arms for their intended use.

Some of the objects of the invention having been stated, other objects will appear as the description proceeds, when taken in connection with the accompanying drawings, in which—

FIGURE 1 is an elevational view of the nut picker;
FIGURE 2 is an enlarged fragmentary elevational view of the lower portion of FIGURE 1;
FIGURE 3 is a fragmentary elevational view looking from the left side of FIGURE 2;
FIGURE 4 is a fragmentary elevational view looking from the right side of FIGURE 2;
FIGURE 5 is a horizontal sectional view taken on line 5—5 of FIGURE 4; and
FIGURE 6 is a fragmentary isometric view looking from the bottom of FIGURE 2.

Referring more specifically to the drawings, reference numeral 10 broadly indicates an elongate container or receptacle in which the gathered nuts are retained. A handle 11 provided with a cross member 12 at its upper end is suitably secured to the container by a pair of opposed braces 13. As shown, bolts 14 penetrate the braces 13 and handle 11 to secure the handle in the desired position. For adjusting the handle 11 in accordance with the height of the individual using the device, a plurality of transverse opening 15 are provided in the handle. As shown in FIGURE 1, the handle 11 is in the position of being used by an average height person. In the event a tall person desires to use the nut picker, the bolts 14 will be removed from their position and the handle moved upwardly to thus utilize the lowest two openings 15 in the handle, to thus elevate the handle relative to the container 10.

The container 10 is shown as being substantially circular in cross-section and has a reduced inverted frustoconically shaped intermediate portion 10a which joins a restricted annular portion 10b which serves to define an opening 16 in the bottom of the container. The top of the container 10 is preferably open to periodically permit the nuts and the like to be readily dumped or discharged from the container.

The restricted lower portion 10b of the container is provided with a pair of separated transversely disposed slots 20 and 21 respectively, which are defined by upper and lower wall edge portions 20a, 21a, and 20b, 21b, respectively. These slots 20 and 21 are preferably divergingly arranged or upwardly inclined relative to the opening 16 of the container for reasons to be pointed out shortly. Extending inwardly from the lower edge of the container portion 10b adjacent the bottom opening 16 are a pair of longitudinally extending spaced apart slots 22 and 23. As shown in FIGURE 6, these longitudinally extending slots 22 and 23 are positioned on the opposite side of the container 10 from the transverse slots 20 and 21.

To control the passage of nuts or the like through the bottom opening 16 of the container and to retain the nuts in the container a pair of spaced apart transversely extending resilient arms or legs 30 and 31 are provided. As shown in FIGURES 5 and 6 the resilient arms 30 and 31 are preferably formed from inherently resilient or flexible wire which permits the arms to readily be sprung apart and when released, return to their normal position. Medial portions of the arms are bowed outwardly away from each other to define a substantially elliptically shaped space therebetween for facilitating the passage of the nuts and the like therebetween into the container 10.

End portions 30a and 31a of the arms 30 and 31 extend through the proximal portions of the transversely disposed slots 20 and 21 and are guided, when sprung apart from each other when a nut passes between the arms, by the edges 20a, 21a of the container which define the upper edges of the slots 20 and 21, respectively. This operation will be explained in more detail shortly.

Opposed portions 30b and 31b of the arms 30 and 31 remote from the end portions 30a and 31a extend through the longitudinally extending slots 23 and 22, respectively, in the container 10, as clearly shown in FIGURE 6. A web portion 32, shown as being formed integral with the end portions 30b and 31b of the arms, connects the arms together and is in turn detachably connected to a bracket assembly broadly indicated by reference numeral 40.

As shown, the bracket assembly 40 comprises an elongate plate 41 having an elongate slot 42 therein, with the lower portion of the plate 42 having an upturned end 43 which faces inwardly toward the container and serves for engaging the web portion 32 to connect the arms 30, 31 to the container. A bolt 44 penetrates the wall of the container 10 and the elongated slot 42 in the plate 41 and serves in conjunction with a wing nut 45 for maintaining the plate 41 in the desired adjusted position for supporting the resilient arms 30, 31.

It is seen that with this type of bracket assembly 40, the resilient arms 30 and 31 may readily be replaced in the event of wear or damage by merely loosening the wing nut 45 to thus permit the plate 41 to be lowered at which point the web portion 32 connecting the arms together can be lifted clear of the upturned end portion 43 of the plate to thus permit the arms to be slidably withdrawn from the transverse slots 20 and 21. In a similar reverse manner, new arms can be replaced and secured to the container for serving the desired function.

In operation, upon a downward pressure being applied to the handle 11 to move the container 10 against the ground, a nut, for example, upon engaging the arms 30 and 31 will cause the end portions 30a, 31a thereof to be sprung apart, as shown in dotted lines in FIGURE 5, to permit the nut to pass therebetween and into the interior of the container 10. During this spreading apart movement of the end portions 30a, 31a of the arms, the arms will be moved apart in an upwardly inclined or diverging path of travel due to the arms being guided by the edge portions 20a, 21a, which define the upper edges of the upwardly inclined transversely disposed slots 20 and 21. It has been determined that this upward diverging movement of the arms during their being spread apart by a nut passing therebetween aids in prolonging the life of the arms by serving to cushion the initial impact on the arms when engaging a nut. Also, as is apparent, the upwardly inclined relation of the slots 20 and 21 enables the arms 30 and 31 to move apart from each other in a gradual manner without binding against the wall of the container.

It should also be noted that the edges 20b and 21b defining the lower edges of the slots 20 and 21, respectively, serve as guiding surfaces for guiding the arms 30 and 31 to their normal position, as shown in solid lines in FIGURE 5, after the passage of a nut therebetween. In this connection, it must be kept in mind that the weight of the nuts in the container 10 exerts a downward pressure on the arms 30 and 31 which serve as a support for the nuts to prevent their being displaced from the container.

It is thus seen that there has been described a nut picker wherein the resilient arms for gathering and retaining the nuts in the container are so constructed and arranged that they function in a smooth manner which results in prolonging the life of the arms while at the same time the arrangement of the arms permits their ready replacement when found desirable for the reasons mentioned earlier.

In the drawings and specification there has been set forth a preferred embodiment of the invention, and although specific terms are employed, they are used in a generic and descriptive sense only and not for purposes of limitation, the scope of the invention being defined in the claims.

I claim:

1. A device for picking up nuts and the like from the ground comprising a container having an opening in the bottom thereof through which nuts and the like are adapted to pass, means cooperating with said container opening for gathering and retaining the nuts passing therethrough comprising a pair of spaced apart resilient wire arms positioned in and transversely of said opening adjacent the lower edge of said container, one corresponding end of each of said resilient arms being free, said container having means for slidably receiving said free ends of said resilient arms to permit the resilient arms to move away from each other upon a nut passing therebetween, and means carried by said container for preventing relative movement of the other corresponding ends of said resilient arms.

2. A device for picking up nuts and the like from the ground comprising an elongate container provided with an opening in the bottom thereof through which the nuts are adapted to pass, means cooperating with said opening in the bottom of said container to gather and retain nuts passing therethrough comprising a pair of spaced apart resilient wire arms positioned in and transversely of said opening, said container having a pair of separated transversely disposed slots therein positioned adjacent said opening, said arms having corresponding free end portions, said free end portions extending through said slots for movement therein, and means securing other end portions of said arms, remote from said slots, to said container.

3. In a device according to claim 2 wherein said means for securing said other end portions of said arms to said container comprises a bracket assembly having a plate with an elongated slot therein, means secured to said container and penetrating the slot of said plate for adjustably securing the bracket assembly to the container, said plate having an upturned lower end portion, and means formed integral with said other end portions of said arms for connecting the arms together and being engaged by said upturned lower end portion of said plate to secure said other end portions of said arms to said container.

4. In a device according to claim 2 wherein means are formed integral with said other end portions of said resilient arms for connecting the arms together, said container having a pair of spaced apart longitudinally extending slots therein positioned adjacent said container opening and remote from said transversely extending slots, said other end portions of said resilient arms being positioned in said longitudinally extending slots, and said means securing said other end portions of said arms to said container comprising a longitudinally adjustable plate having an upturned lower end portion positioned adjacent the upper end of said longitudinal slots and engaging said means connecting the resilient arms together.

5. In a device according to claim 2 wherein said transverse slots in the container extend upwardly and away from said container opening to permit the free end portions of said resilient arms positioned therein to move upwardly and apart from each other upon a nut passing between the resilient arms.

6. A device for picking up nuts and the like from the ground comprising an elongate container provided with an opening in the bottom thereof through which the nuts are adapted to pass, means cooperating with said opening in the bottom of said container to gather and retain nuts passing therethrough comprising a pair of spaced apart resilient wire arms positioned in and transversely of said opening, said container having a pair of separated transversely disposed slots therein adjacent said opening and extending upwardly and away from said opening, said arms having corresponding free end portions, said free end portions extending through said slots for sliding movement therein, said container having a pair of spaced apart longitudinally extending slots therein positioned adjacent said container opening and on the opposite side of the container from said transversely disposed slots, said resilient arms having portions thereof extending through said longitudinally extending slots, means formed integral with said arm portions extending through said longitudinally extending slots for connecting said arms together, and means carried by said container and connected to said means connecting said arms together for supportingly securing said arms to said container.

References Cited in the file of this patent

UNITED STATES PATENTS

| | | |
|---|---|---|
| 713,672 | Oliver | Nov. 18, 1902 |
| 2,706,657 | Talley | Apr. 19, 1955 |